US010101471B2

(12) United States Patent
Wieczorek et al.

(10) Patent No.: US 10,101,471 B2
(45) Date of Patent: Oct. 16, 2018

(54) CHARACTERIZATION APPARATUS FOR CHARACTERIZING SCINTILLATOR MATERIAL

(71) Applicants: KONINKLIJKE PHILIPS N.V., Eindhoven (NL); IOFFE PHYSICAL TECHNICAL INSTITUTE, St. Petersburg (RU)

(72) Inventors: Herfried Karl Wieczorek, Aachen (DE); Cornelis Reinder Ronda, Aachen (DE); Hans-Aloys Wischmann, Henstedt-Ulzburg (DE); Pavel Georgiyevich Baranov, Saint Petersburg (RU); Gaik Asatrian, Saint Petersburg (RU); Danil Olegovich Tolmachev, Saint Petersburg (RU)

(73) Assignees: KONINKLIJKE PHILIPS N.V., Eindhoven (NL); IOFFE PHYSICAL TECHNICAL INSTITUTE, St. Petersburg (RU)

( * ) Notice: Subject to any disclaimer, the term of this patent is extended or adjusted under 35 U.S.C. 154(b) by 52 days.

(21) Appl. No.: 15/326,685

(22) PCT Filed: Jul. 10, 2015

(86) PCT No.: PCT/EP2015/065802
§ 371 (c)(1),
(2) Date: Jan. 17, 2017

(87) PCT Pub. No.: WO2016/012269
PCT Pub. Date: Jan. 28, 2016

(65) Prior Publication Data
US 2017/0205515 A1    Jul. 20, 2017

(30) Foreign Application Priority Data

Jul. 23, 2014  (EP) .................................. 14178160

(51) Int. Cl.
*G01T 1/20* (2006.01)
*G01T 1/202* (2006.01)

(52) U.S. Cl.
CPC .................................. *G01T 1/202* (2013.01)

(58) Field of Classification Search
CPC ...................................................... G01K 11/20
See application file for complete search history.

(56) References Cited

U.S. PATENT DOCUMENTS

| 5,140,159 A | 8/1992 | Blasse |
| 5,905,772 A | 5/1999 | Rutten |

(Continued)

FOREIGN PATENT DOCUMENTS

WO    2008/126012    10/2008

OTHER PUBLICATIONS

Drozdowski, et al., "Effect of Electron Traps on Scintillation of Praseodymium Activated LuA10", IEEE Transactions on Nuclear Science, vol. 55, No. 1, Feb. 1, 2009.

(Continued)

*Primary Examiner* — Kiho Kim

(57) ABSTRACT

The invention relates to a characterization apparatus (1) for characterizing scintillator material (3) especially for a PET detector. A first radiation source (2) irradiates the scintillator material with first radiation (4) having a wavelength being smaller than 450 nm. Then, a second radiation source (5) irradiates the scintillator material with pulsed second radiation (6) having a wavelength being larger than 600 nm and having a pulse duration being equal to or smaller than 50 s, wherein a detection device (9) detects third radiation (12) from the scintillator material (3) during and/or after the irradiation by the second radiation. The third radiation depends on the amount of charge carriers trapped at electronic defects of the scintillator material such that it can be (Continued)

used as an indicator for the amount of electronic defects and hence for characterizing the scintillator material. This characterization can be performed relatively fast and in a relatively simple way.

18 Claims, 4 Drawing Sheets

(56) References Cited

U.S. PATENT DOCUMENTS

| | | | | |
|---|---|---|---|---|
| 5,949,539 | A * | 9/1999 | Britton, Jr. | G01K 11/20 250/458.1 |
| 6,123,455 | A * | 9/2000 | Beshears | G01K 11/20 374/159 |
| 6,307,212 | B1 | 10/2001 | Huston | |
| 6,757,354 | B2 * | 6/2004 | Skatter | G01B 15/04 378/10 |
| 2012/0168631 | A1 | 7/2012 | Duraj | |

OTHER PUBLICATIONS

Poolton, et al., "Non-resonant X-ray/laser interaction spectoscopy as a method for assessing charge competition, trapping and luminescence efficiency in wide band-gap materials", Journal of Luminescence, vol. 130, No. 8, Aug. 1, 2010.

Glodo, et al., "Thermoluminescene and scintillation properties of LuAP and YAP", Journal of Alloys and Compounds, vol. 300-301, Apr. 1, 2000.

Pazzi, et al., "Delayed recombination luminescence in lead tungstate (PWO) scintillating crystals", Journal of Luminescence, vol. 102-103, May 1, 2003.

* cited by examiner

CHARACTERIZATION APPARATUS FOR CHARACTERIZING SCINTILLATOR MATERIAL

CROSS REFERENCE TO RELATED APPLICATIONS

This application is the U.S. National Phase application under 35 U.S.C. § 371 of International Application No. PCT/EP2015/065802, filed Jul. 10, 2015, published as WO2016/012269 on Jan. 28, 2016, which claims the benefit of European Patent Application Number 14178160.9 filed Jul. 23, 2014. These applications are hereby incorporated by reference herein.

FIELD OF THE INVENTION

The invention relates to a characterization apparatus and a characterization method for characterizing scintillator material. The invention relates further to a computer program for controlling the characterization apparatus and to a manufacturing method for manufacturing a detection device for detecting ionizing radiation.

BACKGROUND OF THE INVENTION

The article "Effect of Electron Traps on Scintillation of Praseodymium Activated $Lu_3Al_5O_{12}$" by W. Drozdowski et al., IEEE Transactions on Nuclear Science, volume 56, number 1, pages 320 to 327 (2009) discloses a measurement of x-ray excited emission spectra and Cs-137 gamma-ray pulse height spectra in a range from 78 to 600 K and of thermoluminescence glow curves.

The article "Non-resonant X-ray/laser interaction spectroscopy as a method for assessing charge competition, trapping and luminescence efficiency in wide band-gap materials" by N. R. J. Poolton et al., Journal of Luminescence, volume 130, pages 1404 to 1414 (2010) discloses an apparatus for non-resonant x-ray/laser interaction spectroscopy, which comprises an x-ray source with a shutter and a pulsed laser diode module.

In positron emission tomography (PET) imaging systems scintillator materials are used, in order to emit visible or ultraviolet (UV) light after excitation by 511 keV gamma quanta with high photon gain, good energy resolution, fast signal decay and fast signal rise. Known scintillator materials, which generally fulfill these properties, are, for instance, bismuth germanate (BGO), cadmium tungstate (CWO), lutetium orthosilicate (LSO), LSO modified by 10 percent of yttrium instead of lutetium (LYSO) and gadolinium based garnets like lutetium gadolinium gallium aluminum garnets (LGGAG).

The actual performance of these scintillator materials depends strongly on the number of electronic defects, i.e. the number of traps, in the scintillator materials. These traps may be caused by, for instance, contamination of raw materials, inexact stoichiometry, loss of oxygen or other parts of the respective compounds like gallium, resulting in vacancies, anti-site defects et cetera. During a PET imaging procedure several thousands of electrons and holes may be generated after absorption of the 511 keV gamma quanta, wherein a recombination of these charge carriers at luminescent sites of the scintillator material should ideally result in a high number of optical photons, which are emitted within a short time with a pulse shape defined by a rise time in the range of, for instance, 100 ps to 2 ns and a decay time of, for example, a few tens of nanoseconds and which are detected by an optical detector of the PET imaging system within an integration time of, for instance, a few hundred nanoseconds. However, in the presence of electronic defects the charge carriers will be partly trapped at these defects, giving rise to delayed luminescence or resulting in a non-luminescent recombination. This can result in a change in photon gain, a lower energy resolution, a lower timing performance, i.e. an increased coincidence resolving time (CRT), and a deterioration of image quality. The scintillator material should therefore be characterized with respect to its expected performance and only scintillator materials, which have a desired performance, should be selected and used for manufacturing a PET detection device.

A known characterization technique is based on a measurement of x-ray afterglow. The scintillator material is irradiated with an x-ray pulse having a relative high radiation dose of up to 1 Gy and then an afterglow signal is measured, wherein the scintillator material is characterized based on the measured afterglow signal. However, this technique requires a measurement of the afterglow signal over a very large dynamic range, which might be about six orders of magnitude, and over a very long time, i.e. up to days, which can render the measurement very laborious.

SUMMARY OF THE INVENTION

It is an object of the present invention to provide a characterization apparatus and a characterization method for characterizing scintillator material, which allows for a less laborious characterization of the scintillator material. It is a further object of the present invention to provide a computer program for controlling the characterization apparatus and to provide a manufacturing method for manufacturing a detection device for detecting ionizing radiation.

In a first aspect of the present invention a characterization apparatus for characterizing scintillator material is presented, wherein the characterization apparatus comprises:

a first radiation source for irradiating the scintillator material with first radiation having a wavelength being smaller than 450 nm, a second radiation source for irradiating the scintillator material with pulsed second radiation having a wavelength being larger than 600 nm and having a pulse duration being equal to or smaller than 50 s, after the scintillator material has been irradiated with the first radiation, and a detection device for detecting third radiation from the scintillator material during and/or after the irradiation by the second radiation, in order to allow for a characterization of the scintillator material based on the detected third radiation.

Due to the irradiation of the scintillator material with the first radiation having a wavelength being smaller than 450 nm electrons may be generated in the conduction band and holes may be generated in the valence band. A larger part of these charge carriers may recombine at luminescent sites of the scintillator material and may generate thereby luminescent radiation. However, some charge carriers may be trapped at electronic defects of the scintillator material. By irradiating the scintillator material with the second radiation having a wavelength being larger than 600 nm, these trapped charge carriers may be released into the conduction band or the valence band, respectively, where they move, and the released charge carriers may generate luminescent radiation at the luminescent sites of the scintillator material. This luminescent radiation, which may be regarded as being photostimulated luminescence (PSL), can be the third radiation which is detected by the detection device.

Since the third radiation depends on the amount of charge carriers trapped at the electronic defects of the scintillator material, the third radiation can be used as an indicator for the amount of electronic defects, which trap charge carriers, and hence for characterizing the scintillator material. Moreover, since, in comparison to the afterglow based characterization, for measuring the third PSL radiation a smaller dynamic measurement range and much less measurement time is required, the characterization can be simpler and less laborious.

Since the pulsed second radiation has a relatively short pulse duration being equal to or smaller than 50 s, heating up the scintillator material due to the irradiation by the second radiation and accompanying thermal effects, which can reduce the quality of the optical detection of the third radiation, can be reduced. This can lead to a further improved characterization of the scintillator material.

The characterization apparatus is preferentially adapted to characterize a PET scintillator material, a single photon emission computed tomography (SPECT) scintillator material and/or a computed tomography (CT) scintillator material. Moreover, the characterization apparatus is preferentially adapted to characterize a scintillator material comprising BGO and/or CWO and/or LSO and/or LYSO and/or a gadolinium based garnet.

The scintillator material, which is characterized by the characterization apparatus, can be a final scintillator like a final scintillator stick, which should be used in a detection device for detecting ionizing radiation. However, the scintillator material can also be a starting material, i.e. a raw powder material, which is used for producing the final scintillator, or the scintillator material can be an intermediate product which, with respect to the production process for producing the final scintillator, is arranged between the starting material and the final scintillator, wherein the intermediate product might be an ingot. The second radiation source is preferentially a light emitting diode or a laser.

It is preferentially adapted to emit red light having a wavelength being larger than 600 nm or to emit infrared light. The second radiation source may be adapted to irradiate the scintillator material with a single second radiation pulse or with several second radiation pulses. The first radiation source is preferentially adapted to irradiate the scintillator material with ionizing radiation, especially with x-rays and/or ionizing UV radiation and/or gamma rays as the first radiation. However, in an embodiment the first radiation source may be adapted to irradiate the scintillator material with non-ionizing UV radiation or visible radiation having a wavelength being smaller than 450 nm. Also the first radiation source is preferentially adapted to irradiate the scintillator material with pulsed radiation.

In an embodiment the second radiation source is adapted to irradiate the scintillator material, after the scintillator material has been irradiated with the first radiation, firstly with second radiation having a first wavelength being larger than 600 nm and then with second radiation having a second wavelength, wherein the second wavelength is smaller than the first wavelength. Thus, firstly, after the scintillator material has been irradiated with the first radiation, the scintillator material can be irradiated with one or several pulses having a first wavelength, wherein the third radiation is detected during and/or after the irradiation by the pulsed second radiation having the first wavelength. Then the scintillator material can be irradiated with one or several further second radiation pulses having a second wavelength, wherein the second wavelength is smaller than the first wavelength and wherein during and/or after the irradiation by the one or several further second radiation pulses the third radiation is detected. This irradiation and detection procedure can be continued with further second radiation pulses having smaller wavelengths, i.e. the scintillator material can be irradiated with one or several second radiation pulses having a first wavelength, then the scintillator material can be irradiated with one or several second radiation pulses having a second wavelength, followed by irradiating the scintillator material with one or several second radiation pulses having a third wavelength, et cetera, wherein the wavelengths decrease, i.e. the second wavelength is smaller than the first wavelength, the third wavelength is smaller than the second wavelength, et cetera. This allows detecting the third radiation depending on the wavelength of the pulsed second radiation, which in turn allows for a discrimination of charge carrier traps at different energy levels. The first wavelength is larger than 600 nm. One or several of the further wavelengths, i.e., for instance, the second wavelength, can also be larger than 600 nm or they can be equal to or smaller than 600 nm.

If the scintillator material is irradiated with different second radiation pulses having different, decreasing wavelengths, the third radiation for a certain second radiation pulse may be detected during the irradiation by the second radiation pulse and/or after the irradiation by the second radiation pulse and before a following irradiation by a next second radiation pulse, which may have the same wavelength as the previous second radiation pulse or which may have a smaller wavelength.

In order to provide several second radiation pulses having different wavelengths, the second radiation source may comprise several sub-radiation sources having different wavelengths. However, the second radiation source can also be a single radiation source being able to provide different wavelengths, in order to irradiate the scintillator material with second radiation pulses having different wavelengths. Also if the second radiation source provides several second radiation pulses having different wavelengths, the second radiation pulses have a pulse duration being equal to or smaller than 50 s.

In an embodiment the detection device is adapted to generate a detection signal depending on the detected third radiation, wherein the characterization apparatus further comprises a calculation unit for integrating the detection signal, in order to allow for a characterization of the scintillator material based on the integrated detection signal. The integrated detection signal can be regarded as being an indicator for the amount of released charge carriers and thus for the adverse effect of the electronic defects on the luminescence. The integrated detection signal is therefore very suitable for characterizing the scintillator material.

The scintillator material generates luminescence having a luminescence wavelength when irradiated with ionizing radiation, wherein the detection device is preferentially adapted to detect radiation having the luminescence wavelength. In particular, the detection device comprises a wavelength filter being adapted to allow light having the luminescence wavelength to pass the wavelength filter and a photodetector for detecting the filtered light. Using this wavelength filter improves the accuracy of detecting the third radiation, which in turn can lead to a further improved characterization of the scintillator material.

In an embodiment the characterization apparatus is adapted such that the temporal distance between a termination of the irradiation of the scintillator material with the first radiation and a beginning of the irradiation of the scintillator material with the second radiation is equal to or smaller than 500 s, further preferred smaller than 100 s. Moreover, this temporal distance may be larger than 60 s. Thus, the third radiation can be detected very fast after the illumination by the first radiation has been stopped, which can lead to a relatively short characterization time.

In a further aspect of the present invention a characterization method for characterizing scintillator material is presented, wherein the characterization method comprises:
  irradiating the scintillator material with first radiation having a wavelength being smaller than 450 nm,
  irradiating the scintillator material with pulsed second radiation having a wavelength being larger than 600 nm and having a pulse duration being equal to or smaller than 50 s, after the scintillator material has been irradiated with the first radiation,
  detecting third radiation from the scintillator material during and/or after the irradiation with the second radiation, in order to allow for a characterization of the scintillator material based on the detected third radiation.

In another aspect of the present invention a manufacturing method for manufacturing a detection device for detecting ionizing radiation is presented, wherein the manufacturing method comprises:
  providing scintillator material which generates luminescence when irradiated with ionizing radiation and providing a detector for detecting the luminescence,
  characterizing the scintillator material by performing a characterization method for characterizing scintillator material, the characterization method comprising: Irradiating the scintillator material with first radiation having a wavelength being smaller than 450 nm, irradiating the scintillator material with pulsed second radiation having a wavelength being larger than 600 nm and having a pulse duration being equal to or smaller than 50 s, after the scintillator material has been irradiated with the first radiation, detecting third radiation from the scintillator material during and/or after the irradiation with the second radiation, in order to allow for a characterization of the scintillator material based on the detected third radiation,
  selecting scintillator material to be used for manufacturing the detection device based on the characterization,
  manufacturing the detection device based on the selected scintillator material and the provided detector.

In a further aspect of the present invention a computer program is presented for controlling a characterization apparatus for characterizing scintillator material, the characterization apparatus comprising: a first radiation source for irradiating the scintillator material with first radiation having a wavelength being smaller than 450 nm, a second radiation source for irradiating the scintillator material with pulsed second radiation having a wavelength being larger than 600 nm and having a pulse duration being equal to or smaller than 50 s, after the scintillator material has been irradiated with the first radiation, a detection device for detecting third radiation from the scintillator 10 material during and/or after the irradiation by the second radiation, in order to allow for a characterization of the scintillator material based on the detected third radiation. The computer program comprises program code means for causing the characterization apparatus to carry out the steps of the characterization method as defined in above, when the computer program is run on a computer controlling the characterization apparatus.

It shall be understood that the characterization apparatus described above, the characterization method described above, a manufacturing method for manufacturing a detection device for detecting ionizing radiation, the manufacturing method comprising: providing scintillator material which generates luminescence when irradiated with ionizing radiation and providing a detector for detecting the luminescence, characterizing the scintillator material by performing the characterization method as defined above, selecting scintillator material to be used for manufacturing the detection device based on the characterization, manufacturing the detection device based on the selected scintillator material and the provided detector, and a computer program for controlling a characterization apparatus, the computer program comprising program code means for causing the characterization apparatus to carry out the steps of the characterization method as defined above, when the computer program is run on a computer controlling the characterization apparatus, have similar and/or identical preferred embodiments.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
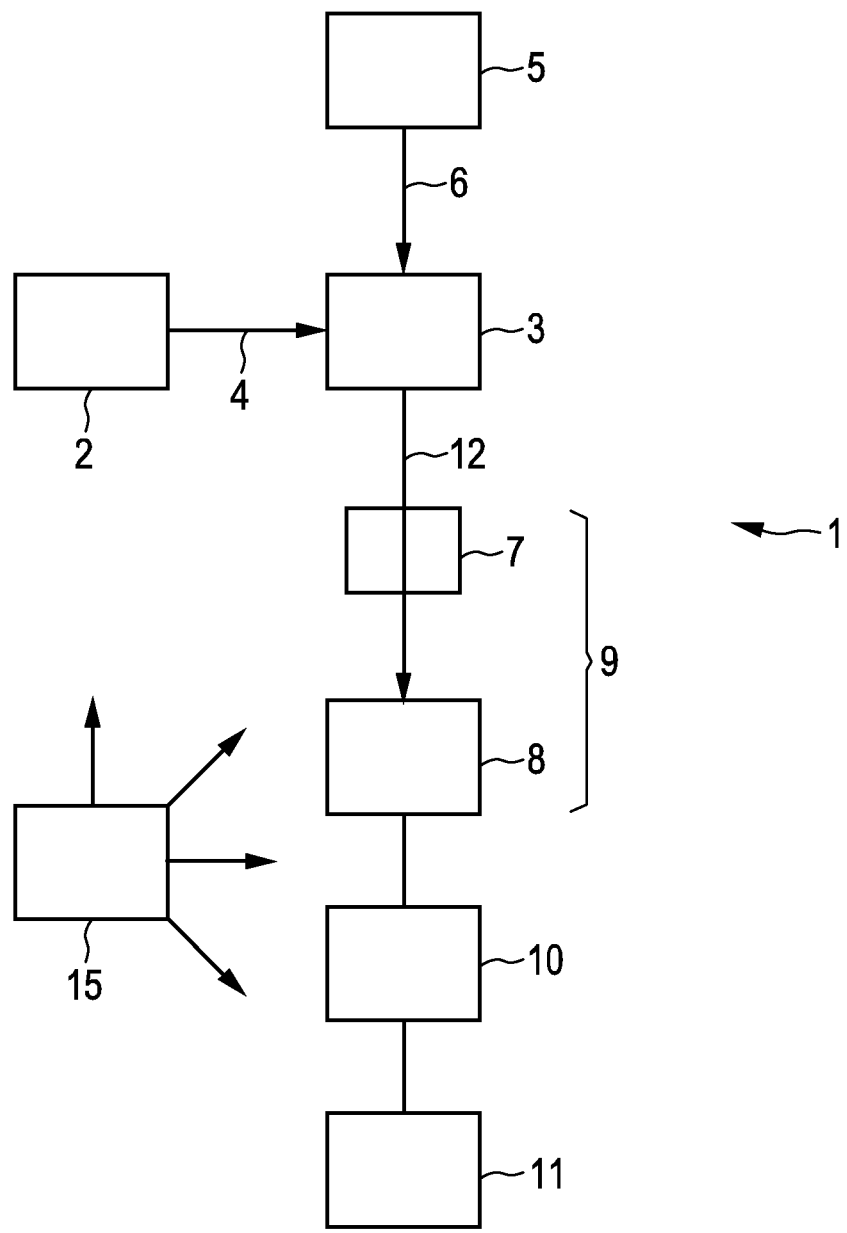
FIG. 1 shows schematically and exemplarily an embodiment of a characterization apparatus for characterizing scintillator material.

FIG. 1 shows schematically and exemplarily an embodiment of a characterization apparatus for characterizing scintillator material. The characterization apparatus 1 comprises a first radiation source 2 for irradiating the scintillator material 3 with ionizing first radiation 4 which might be, for instance, x-rays, UV radiation or gamma radiation. Preferentially, the first radiation source 2 is adapted to irradiate the scintillator material 3 with a radiation pulse. The radiation pulse can have a pulse duration of a few seconds, i.e., for instance, within a range of 1 s to 30 s, if the ionizing first radiation is gamma radiation or x-radiation, and within a range of a second to some minutes, i.e., for instance, in the range of 1 s to 10 min, if the ionizing first radiation is UV radiation.

The characterization apparatus 1 further comprises a second radiation source 5 for irradiating the scintillator material 3 with second radiation 6 having a wavelength being larger than 600 nm, after the scintillator material 3 has been irradiated with the first radiation 4. Thus, while the first radiation source 2 irradiates the scintillator material 3 with the first radiation 4, the second radiation source 5 does not irradiate the scintillator material 3 with the second radiation 6. The scintillator material 3 is only irradiated with the second radiation 6, after the irradiation with the first radiation 4 has been completed. In this embodiment, the second radiation source 5 is a light emitting diode or an infrared laser, which is adapted to provide pulsed radiation as the second radiation. The pulsed radiation has a duration being equal to or smaller than 50 s. In particular, the pulse duration is preferentially smaller than 40 s, further preferred smaller than 20 s and even further preferred smaller than 10 s.

The characterization apparatus 1 also comprises a detection device 9 for detecting third radiation 12 from the scintillator material 3 during and after the irradiation by the second radiation pulse 6, in order to allow for a characterization of the scintillator material 3 based on the detected third radiation 12.

The scintillator material 3 generates luminescence having a luminescence wavelength when irradiated with ionizing radiation. Such luminescence having the luminescence wavelength can also be generated, if charge carriers trapped at electronic defects within the scintillator material 3 are released in the conduction band or valence band, respectively, because the released charge carriers can then move and generate the luminescence at luminescent sites of the scintillator material. The luminescent sites are preferentially formed by cerium ions ($Ce^{3+}$). However, the scintillator material can also comprise other luminescent sites like other rare earth ions, for instance, praseodymium ions ($Pr^{3+}$), europium ions ($Eu^{3+}$ or $Eu^{2+}$), terbium ions ($Tb^{3+}$) et cetera. The scintillator can also comprise non-rare-earth ions as luminescent sites like thallium ions ($Tl^+$), bismut ions ($Bi^{3+}$) et cetera.

The charge carriers are released from the traps by using the second radiation pulse 6, wherein the resulting luminescence, i.e. the third radiation 12, is detected by the detection device 9. In order to improve the accuracy of detecting the luminescence, the detection device 9 comprises a wavelength filter being adapted to allow light having the luminescence wavelength to pass the wavelength filter 7 and a photodetector 8 for detecting the filtered third radiation 12.

The characterization apparatus 1 is adapted such that the temporal distance between a termination of the irradiation of the scintillator material 3 with the first radiation 4 and a beginning of the irradiation of the scintillator material 3 with the second radiation 6 is equal to or smaller than 10 s. Thus, the second radiation pulse, which might be an infrared pulse, can be applied right after the excitation by the first radiation pulse such that the whole measurement may be done within a few seconds or minutes. An infrared irradiation dose which is equivalent to a number of photons absorbed per $cm^3$ of scintillator material within a range of $10^{16}$ to $10^{21}$, especially within a range of $10^{16}$ to $10^{19}$, may be used.

The photodetector 8 is adapted to generate a detection signal depending on the detected third radiation 12, wherein the characterization apparatus 1 further comprises a calculation unit 10 for integrating the detection signal, in order to allow for a characterization of the scintillator material based on the integrated detection signal. The integration may lead to an integration value, which can be shown on an output unit 11 like a display.

The scintillator material, which is characterized by the characterization apparatus 1, is preferentially a PET scintillator material, a SPECT scintillator material or a CT scintillator material. In particular, the scintillator material comprises BGO, CWO, LSO, LYSO or a gadolinium based garnet like a gadolinium aluminum garnet ($Gd_3Al_5O_{12}$, GdAG), a gadolinium gallium aluminum garnet ($Gd_3Ga_{5-x}Al_xO_{12}$, GdGAG), an yttrium gadolinium gallium aluminum garnet ($Y_{3-x}Gd_xGa_{5-y}Al_yO_{12}$, YGGAG) or a terbium gadolinium gallium aluminum garnet ($Tb_{3-x}Gd_xGa_{5-y}Al_yO_{12}$, TbGGAG). However, the scintillator material can also comprise another garnet like a lutetium aluminum garnet ($Lu_3Al_5O_{12}$, LuAG), a lutetium gallium aluminum garnet ($Lu_3Ga_{5-x}Al_xO_{12}$, LuGAG), an yttrium aluminum garnet ($Y_3Al_5O_{12}$, YAG) or a terbium aluminum garnet ($Tb_3Al_5O_{12}$, TbAG). The scintillator material can also comprise a chemical mixture of at least two of the mentioned garnets, i.e. solid solutions.

Figure 2:
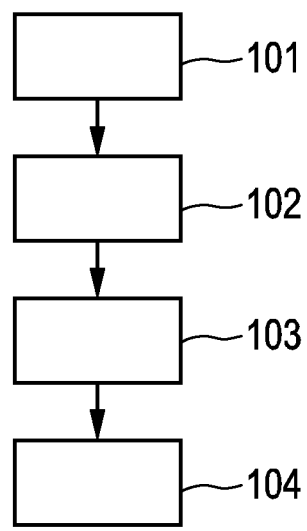
FIG. 2 shows a flowchart exemplarily illustrating an embodiment of a characterization method for characterizing scintillator material.

In the following an embodiment of a characterization method for characterizing scintillator material will exemplarily be described with reference to a flowchart shown in FIG. 2.

In step 101 the scintillator material 3 is irradiated with ionizing first radiation 4. In step 102, after the irradiation with the first radiation 4 has been stopped, the scintillator material 3 is irradiated with the second radiation 6 having a wavelength being larger than 600 nm and third radiation 12, i.e. the photostimulated luminescence, from the scintillator material 3 is detected during and after the irradiation with the second radiation 6. In particular, a detection signal is generated in step 102, which is indicative of the third radiation 12 from the scintillator material 3. In step 103 the generated detection signal is integrated, thereby generating an integration value, which is shown on the output unit 11 in step 104. A user may select suitable scintillator materials based on this integration value.

The characterization apparatus 1 preferentially further comprises a control unit 15 for controlling the different components of the characterization apparatus 1 in accordance with the characterization method. However, in another embodiment the characterization apparatus may also be at least partly manually controlled.

Figure 3:
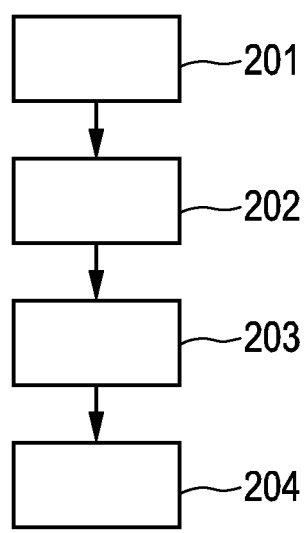
FIG. 3 shows a flowchart exemplarily illustrating an embodiment of a manufacturing method for manufacturing a detection device for detecting ionizing radiation.

In the following an embodiment of a manufacturing method for manufacturing a detection device for detecting ionizing radiation will exemplarily be described with reference to a flowchart shown in FIG. 3.

In step 201 scintillator material is provided, which generates luminescence when irradiated with ionizing radiation. Moreover, in step 201 a detector for detecting the luminescence is provided. In step 202 the scintillator material is characterized as described above with reference to FIG. 2, i.e. integration values are determined for the scintillator material. In step 203 it is decided which scintillator material should be used for manufacturing the detection device based on the determined respective integration value. For instance, if a respective integration value is smaller than a predefined threshold, the respective scintillator material may be selected for being used for manufacturing the detection device. If the respective integration value is larger than this predefined threshold, the respective scintillator material may not be used for manufacturing the detection device. In step 204 the detection device is manufactured based on the selected scintillator material and the provided detector.

The wavelength of the second radiation can be chosen according to the expected energetic depths of the electronic defects so that the detrapping of charge carriers is done effectively. Moreover, this wavelength may be chosen such that a generation of direct luminescence, i.e. a luminescence not generated by the charge carriers released from the electronic defects, does not take place. Especially for these reasons the wavelength of the second radiation is larger than 600 nm and preferentially larger than 650 nm.

The known characterization technique, which has been described in the beginning and which is based on the measurement of the x-ray afterglow, is very limited, especially because charge carriers from relatively deep traps cannot be released in a reasonable time. In contrast, the PSL-based characterization technique, which is described above with reference to FIGS. 1 and 2, allows for a fast and less laborious determination of a total number of trapped charge carriers, also including charge carrier trapped in relatively deep traps.

Figure 4:
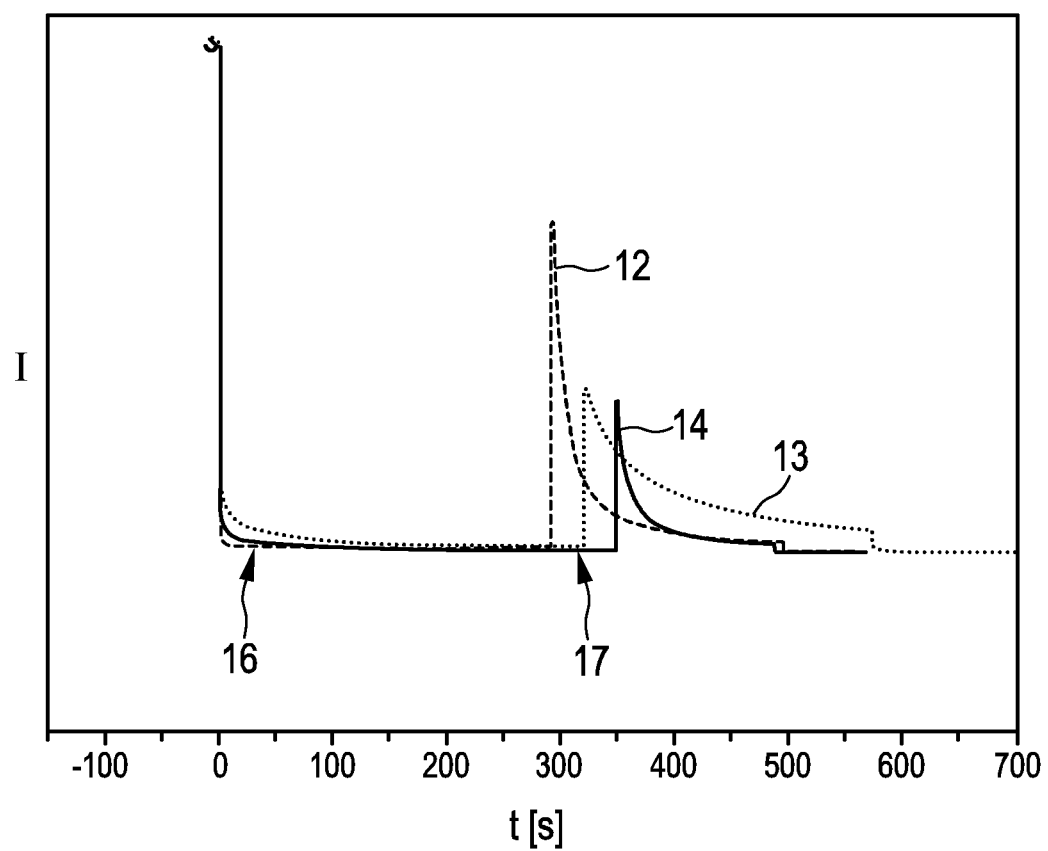
FIG. 4 illustrates differences in the sensitivity of an afterglow based characterization technique and the sensitivity of a PSL based characterization technique.

FIG. 4 exemplarily illustrates differences in the sensitivity of the afterglow based characterization technique and the sensitivity of the PSL based characterization technique.

In FIG. 4 I denotes the normalized intensity and t denotes the time in seconds. Three different graphs 12, 13, 14 are shown, which correspond to three different GdGaG samples. The arrow 16 indicates the afterglow, after the respective GdGaG sample has been irradiated with UV radiation, and the arrow 17 indicates the PSL, after the respective GdGaG sample has been irradiated with an infrared pulse. The afterglow 16, i.e. the decaying signal, is measured during a time span of 300 s. This measurement is done by using a sensitive photomultiplier tube (PMT). The afterglow detection signal is very low after a few hundred seconds so that this measurement method is limited. After excitation by the infrared light pulse, however, the charge carriers that have been trapped in deep traps and that have not yet been thermally excited are released and can easily be measured as PSL 17. The PSL technique is therefore much more sensitive than the afterglow technique.

The characterization apparatus and the characterization method may be adapted for selecting scintillator crystals or ceramics, especially for PET, SPECT or CT imaging. Moreover, the characterization apparatus and the characterization method may be used for selecting scintillator crystals or ceramics for combined imaging system like imaging systems combining a) PET or SPECT imaging with b) CT or magnetic resonance (MR) or ultrasound (US) imaging.

The scintillator material, which is characterized by using the characterization apparatus and the characterization method, can include scintillator sticks, i.e. final scintillators, which are used for manufacturing a detection device for detecting ionizing radiation. However, the scintillator material can also include test structures which have been made from scintillator raw material under production conditions which will also be used for producing the final scintillators. The test structures might be, for instance, discs, which might have a thickness within a range of hundred micrometers to few millimeters, i.e., for instance, within a range of 100 μm to 10 mm. The scintillator material, which is characterized, might also be scintillator powder which might be produced from the scintillator raw material, wherein the scintillator raw material may include oxide powders of, for instance, lutetium, gadolinium, gallium, aluminum et cetera. Also the respective scintillator raw material itself may be characterized by the characterization apparatus and the characterization method, in order to determine whether this scintillator raw material should be used for producing the final scintillators.

The second radiation source may be adapted to irradiate an arbitrary side of the scintillator material, i.e., for instance, of a scintillator material sample actually being characterized. Moreover, the detection device of the characterization apparatus is preferentially in optical contact with the scintillator material, either directly or via, for instance, an optical fiber or an optical coupling liquid that transmits the third radiation from the scintillator material to the photodetector of the detection device. The photodetector may comprise a silicon diode, a PMT or a silicon photomultiplier (SiPM).

Although in above described embodiments the scintillator material has been irradiated with ionizing first radiation, in other embodiments the scintillator material can also be irradiated with non-ionizing first radiation like non-ionizing UV radiation or visible radiation having a wavelength being smaller than 450 nm. If the first radiation is non-ionizing UV radiation or visible light with a wavelength being smaller than 450 nm, a respective radiation pulse may be generated having a pulse duration within a range of a second to some minutes, i.e., for instance, in the range of 1 s to 10 min.

Although in above described embodiments the second radiation source irradiates the scintillator material with pulsed second radiation having a certain wavelength being larger than 600 nm, in other embodiments the second radiation source can irradiate the scintillator material with different second radiation pulses having different wavelengths, wherein the wavelengths of consecutive second radiation pulses are the same or decrease. In particular, the scintillator material may be irradiated with a second radiation pulse having a first wavelength, then with a second radiation pulse having a second wavelength, followed by a second radiation pulse having a third wavelength, et cetera, wherein the wavelengths decrease, i.e. the second wavelength is smaller than the first wavelength, the third wavelength is smaller than the second wavelength, et cetera. The first wavelength is larger than 600 nm, whereas one, several or all of the further wavelengths can be equal to or smaller than 600 nm. However, it is also possible that all further wavelengths are larger than 600 nm.

During and/or after the irradiation of the scintillator material with a second radiation pulse having a certain wavelength, the third radiation is detected, wherein this detection of the third radiation for this certain wavelength of a second radiation pulse is performed before irradiating the scintillator material with a next second radiation pulse having another, smaller wavelength. In this way the third radiation can be detected depending on the wavelength of the second radiation pulses. For instance, for each wavelength a detection signal can be generated depending on the detected third radiation and the detection signal can be integrated, wherein the integrated detection signal determined for a certain wavelength can be used for estimating the number of charge carriers released from the traps by using the respective wavelength of the second radiation. This allows for an estimation of the number of traps at different energy levels.

The second radiation source can comprise several sub-radiation sources for providing the different wavelengths. Thus, information about the depths of the traps can be obtained by using several sub-radiation sources and by operating them sequentially with decreasing wavelengths, i.e. with increasing photon energy. If the photon energy is too small, i.e. smaller than the energy difference needed for promoting trapped charge carriers optically to the conduction band or the valance band, respectively, the trapped charge carriers cannot be promoted to the conduction band or the valance band, respectively, as the traps are too deep and no detection signal is obtained. With increasing photon energy the depths of the traps, from which charge carriers can be promoted to the conduction band or the valance band, respectively, increases. This enables a discrimination of traps at different energy levels, provided that sequentially sub-radiation sources with decreasing wavelengths are being used as traps that are emptied by radiation with low photon energy will also be emptied by photons with higher energy.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Procedures like the calculation of the integration value and the control of the characterization apparatus in accordance with the characterization method can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention relates to a characterization apparatus for characterizing scintillator material especially for a PET detector. A first radiation source irradiates the scintillator material with first radiation having a wavelength being smaller than 450 nm. Then, a second radiation source irradiates the scintillator material with pulsed second radiation having a wavelength being larger than 600 nm and having a pulse duration being equal to or smaller than 50 s, wherein a detection device detects third radiation from the scintillator material during and/or after the irradiation by the second radiation. The third radiation depends on the amount of charge carriers trapped at electronic defects of the scintillator material such that it can be used as an indicator for the amount of electronic defects and hence for characterizing the scintillator material. This characterization can be performed relatively fast and in a relatively simple way.

The invention claimed is:

1. A characterization apparatus for characterizing scintillator material, the characterization apparatus comprising:
   a first radiation source for irradiating the scintillator material with first radiation having a wavelength being smaller than 450 nm;
   a second radiation source for irradiating the scintillator material with second radiation having a wavelength being larger than 600 nm;
   a detection device for detecting third radiation from the scintillator material during and/or after the irradiation by the second radiation, and adapted to generate a detection signal depending on the detected third radiation; and
   a control unit comprising a computer programmed to perform a characterization method including:
      controlling the first radiation source to irradiate the scintillator with the first radiation and to control the second radiation source to irradiate the scintillator with pulsed second radiation having a pulse duration equal to or smaller than 50 seconds, after the irradiating of the scintillator material with the first radiation has been completed,
      integrating the detection signal generated by the detection device, in order to allow for a characterization of the scintillator material based on the integrated detection signal.

2. The characterization apparatus as defined in claim 1, wherein the first radiation source is adapted to irradiate the scintillator material with ionizing radiation.

3. The characterization apparatus as defined in claim 2, wherein the first radiation source is adapted to irradiate the scintillator material with x-rays and/or ultraviolet radiation and/or gamma rays as the first radiation.

4. The characterization apparatus as defined in claim 1, wherein the first radiation source is adapted to irradiate the scintillator material with non-ionizing UV radiation or visible radiation having a wavelength being smaller than 450 nm.

5. The characterization apparatus as defined in claim 1, wherein the controller is programmed to control the second radiation source to irradiate the scintillator material, after the scintillator material has been irradiated with the first radiation, firstly with second radiation having a first wavelength being larger than 600 nm and then with second radiation having a second wavelength, wherein the second wavelength is smaller than the first wavelength.

6. The characterization apparatus as defined in claim 1, wherein the scintillator material generates luminescence having a luminescence wavelength when irradiated with ionizing radiation, wherein the detection device is adapted to detect radiation having the luminescence wavelength.

7. The characterization apparatus as defined in claim 6, wherein the detection device comprises a wavelength filter being adapted to allow light having the luminescence wavelength to pass the wavelength filter and a photodetector for detecting the filtered light.

8. The characterization apparatus as defined in claim 1, wherein the temporal distance between a termination of the irradiation of the scintillator material with the first radiation and a beginning of the irradiation of the scintillator material with the second radiation is equal to or smaller than 10 seconds.

9. The characterization apparatus as defined in claim 1, wherein the characterization apparatus is adapted to characterize a positron emission tomography scintillator material, a single photon emission computed tomography scintillator material and/or a computed tomography scintillator material.

10. The characterization apparatus as defined in claim 1, wherein the characterization apparatus is adapted to characterize scintillator material comprising bismuth germanate and/or cadmium tungstate and/or lutetium orthosilicate and/or lutetium orthosilicate modified by 10 percent of yttrium instead of lutetium and/or a gadolinium based garnet.

11. The characterization apparatus as defined in claim 1, wherein, in the characterization method performed by the control unit, while irradiating the scintillator material with the first radiation the scintillator material is not irradiated with the second radiation.

12. The characterization apparatus as defined in claim 1, further comprising:
   a display, wherein the integrating produces an integration value that is displayed on the display.

13. The characterization apparatus as defined in claim 1, wherein:
   the integrating produces an integration value; and
   the characterization method performed by the control unit further includes classifying the scintillator as not to be used for manufacturing a detection device if the integration value is larger than a predefined threshold.

14. A characterization apparatus for characterizing scintillator material, the characterization apparatus comprising:

a first radiation source for irradiating the scintillator material with first radiation having a wavelength being smaller than 450 nm, a second radiation source for irradiating the scintillator material with pulsed second radiation having a wavelength being larger than 600 nm and having a pulse duration being equal to or smaller than 50 s, after the scintillator material has been irradiated with the first radiation, a detection device for detecting third radiation from the scintillator material during and/or after the irradiation by the second radiation, in order to allow for a characterization of the scintillator material based on the detected third radiation;

wherein the detection device is adapted to generate a detection signal depending on the detected third radiation, wherein the characterization apparatus further comprises a calculation unit for integrating the detection signal, in order to allow for a characterization of the scintillator material based on the integrated detection signal.

15. A characterization method for characterizing scintillator material, the characterization method comprising:

irradiating the scintillator material with first radiation having a wavelength being smaller than 450 nm, irradiating the scintillator material with pulsed second radiation having a wavelength being larger than 600 nm and having a pulse duration being equal to or smaller than 50 s, after the irradiating of the scintillator material with the first radiation has been completed, and detecting third radiation from the scintillator material during and/or after the irradiation with the second radiation, in order to allow for a characterization of the scintillator material based on the detected third radiation;

wherein while irradiating the scintillator material with the first radiation the scintillator material is not irradiated with the second radiation; and wherein the temporal distance between termination of the irradiating with the first radiation and beginning of the irradiating with the second radiation is equal to or smaller than ten seconds.

16. A manufacturing method for manufacturing a detection device for detecting ionizing radiation, the manufacturing method comprising:

providing scintillator material which generates luminescence when irradiated with ionizing radiation and providing a detector for detecting the luminescence, characterizing the scintillator material by performing the characterization method as defined in claim 15, selecting scintillator material to be used for manufacturing the detection device based on the characterization, manufacturing the detection device based on the selected scintillator material and the provided detector.

17. The characterization method of claim 15 further comprising:

generating a detection signal depending on the detected third radiation;

integrating the detection signal generated by the detection device to generate an integration value; and displaying the integration value on a display.

18. The characterization method of claim 15 further comprising:

generating a detection signal depending on the detected third radiation;

integrating the detection signal generated by the detection device to generate an integration value; and classifying the scintillator as not to be used for manufacturing a detection device if the integration value is larger than a predefined threshold.

* * * * *